United States Patent [19]
Walker

[11] Patent Number: 5,906,382
[45] Date of Patent: May 25, 1999

[54] REFUSE BAG CART

[76] Inventor: Roy Walker, 861 Sylvan Pl. SW., Atlanta, Ga. 30310

[21] Appl. No.: 08/975,639
[22] Filed: Nov. 21, 1997
[51] Int. Cl.⁶ ....................................................... B62B 1/04
[52] U.S. Cl. .......................... 280/47.26; 248/98; 248/100
[58] Field of Search ............................ 280/47.24, 47.26, 280/37; 248/95, 97, 98, 99, 100, 101

[56] References Cited

U.S. PATENT DOCUMENTS

| | | | |
|---|---|---|---|
| 3,934,894 | 1/1976 | Hoeffken et al. | 248/98 |
| 5,310,102 | 5/1994 | Hougham | 248/100 |
| 5,458,350 | 10/1995 | Johnson et al. | 280/47.26 |
| 5,480,113 | 1/1996 | Hachenberg | 248/100 |

*Primary Examiner*—D. Glenn Dayoan
*Assistant Examiner*—Clovia Hamilton
*Attorney, Agent, or Firm*—John L. James

[57] ABSTRACT

A cart for a refuse bag has a base panel with left, right and rear upright panels attached to it. The panels have top flaps that fold over into the boxy structure formed by the panels to engage the inside of a refuse bag to hold the refuse bag upright. The cart has wheels and a handle for moving the cart and easily transporting the refuse bag.

9 Claims, 1 Drawing Sheet

REFUSE BAG CART

FIELD OF THE INVENTION

The present invention relates generally to refuse bags, and more particularly, to a device for facilitating filling of a refuse bags with leaves or grass clippings and transporting the filled bag.

BACKGROUND OF THE INVENTION

Paper refuse bags are used for yard waste such as leaves and grass clippings. A problem with the paper bags is that they have a tendency to flop over or flop closed making it difficult to fill with leaves or grass clippings. Even though some paper refuse bags may be sufficiently rigid to stand alone when opened, they tend to close when being filled causing the leaves or grass clippings to miss the opening and fall to the ground. Accordingly, it will be appreciated that it would be highly desirable to have a device that would hold the mouth of the bag open while the bag is being filled.

When filling a refuse bag, the bag is dragged or carried from one location to another as refuse is added to the bag. When collecting grass clippings, for example, the bag is moved several times as this is more convenient than carrying the clippings to the bag. When the bag is full, it is dragged or carried to the curb for collection. Dragging the paper bags sometimes causes them to rupture spilling the contents which is undesirable. Also, the contents of the bag often includes twigs and sticks and other debris having a tendency to rupture the bag when the bag is lifted for carrying to the curb. Accordingly, it will be appreciated that it would be highly desirable to have a device to simplify loading and carrying a refuse bag.

SUMMARY OF THE INVENTION

The present invention is directed to overcoming one or more of the problems set forth above. Briefly summarized, according to one aspect of the present invention, a cart for a refuse bag, comprises a base panel; a left upright side panel having a bottom portion attached to the base panel and having a top portion with a left holding flap; and a right upright side panel having a bottom portion attached to the base panel and having a top portion with a right holding flap. A rear upright panel has a bottom portion attached to the base panel and has a top portion with a top holding flap. The base panel, left and right upright side panels and rear upright panel forming a boxy structure. The rear upright panel defines an opening above the top holding flap with a portion of the rear upright panel above the top flap forming a handle for manipulating the cart. A pair of wheels are attached to the boxy structure adjacent the rear upright panel.

The panel flaps hold the paper bag open and prevent its collapse while being filled with grass clippings or other yard debris. The handle allows the cart to be pivoted on its wheels for easy maneuvering. The wheels make moving the cart loaded with a filled bag much less cumbersome than manually lifting and carrying the bag.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 3:
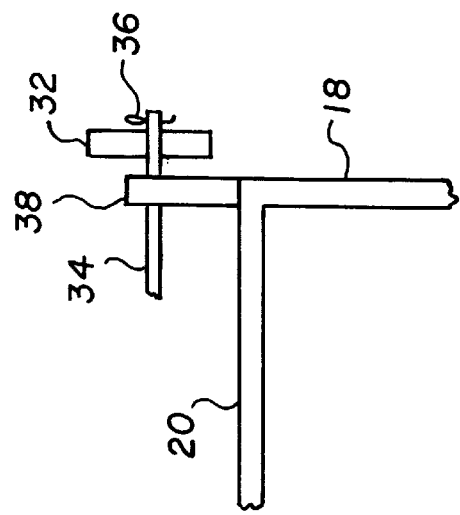
FIG. 3 is a diagrammatic sectional view taken along line III—III of FIG. 1.
Figure 2:
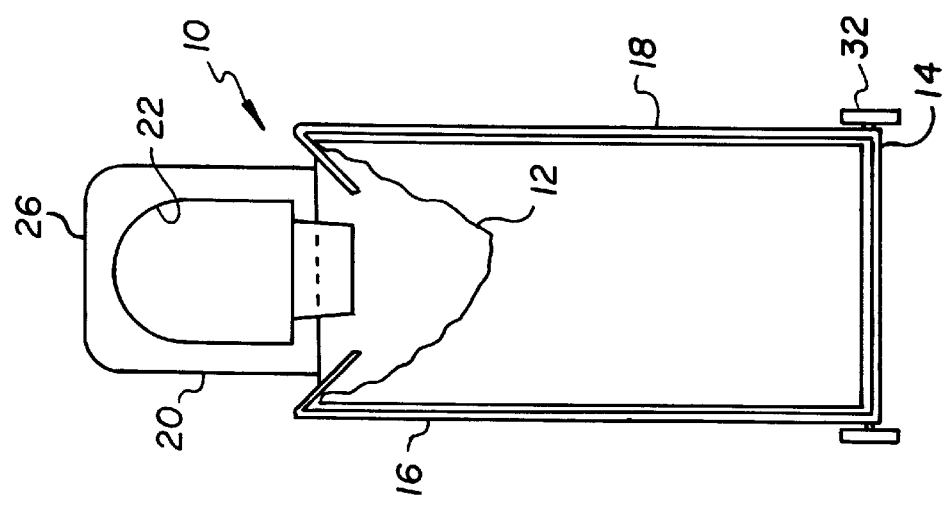
FIG. 2 illustrates the cart of FIG. 1 with a refuse bag installed.
Figure 1:
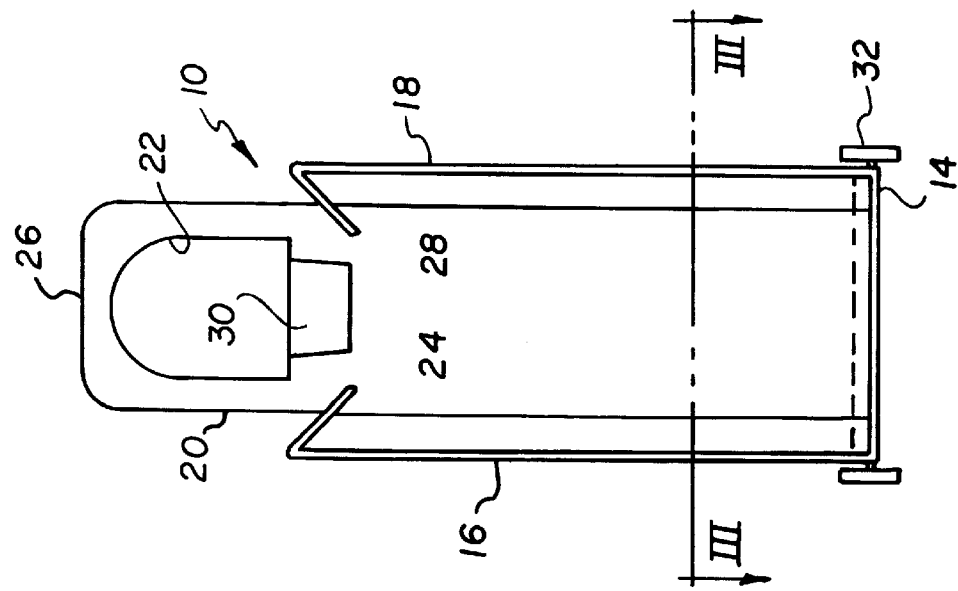
FIG. 1 is a diagrammatic front view of a preferred embodiment of a refuse bag cart according to the present invention.

Referring to FIGS. 1–3, a cart 10 for holding a refuse bag 12 upright and transporting a filled refuse bag 12 is constructed of wooden, paper or plastic panels. There is a horizontally disposed base panel 14, left and right upright side panels 16, 18 and an upright rear panel 20 joined together forming a boxy structure to contain the refuse bag 12.

The left upright side panel 16 has a bottom portion attached to the base panel 14 and has a top portion with a left holding flap 24. Left holding flap 24 folds into the boxy structure toward the left upright side panel 16 to engage a left side panel of the refuse bag 12. Similarly, a right upright side panel 18 has a bottom portion attached to the base panel 14 and has a top portion with a right holding flap 28. Right holding flap 28 folds into the boxy structure toward the right upright side panel 18 to engage a right side panel of the refuse bag 12.

The rear upright panel 20 has a bottom portion attached to the base panel 14 and has a top portion with a top holding flap 30. Top holding flap 30 folds into the boxy structure toward the rear upright panel 20 to engage a rear panel of the refuse bag 12. Rear upright panel 20 defines an opening 22 above the top holding flap 30 with a portion of the rear upright panel 20 above the top flap 30 forming a handle 26 for maneuvering the cart.

The base panel 14, left and right upright side panels 16, 18 and rear upright panel 20 are joined forming a unitary boxy structure. Where paper, such as heavy duty paperboard or corrugated cardboard are used, the panels may be joined by an adhesive or staples, or may be a continuous piece of material creased and molded. Plastic panels may be bonded together while wooden panels are glued or stapled. Of course, combinations of these materials may be used.

A pair of wheels are attached to the boxy structure, preferably adjacent the rear upright panel 20. Each wheel 32 is preferably wood or plastic with a center bore for receiving a rod 34 on which the wheels turn. Each wheel 32 is secured with a retaining pin 36 through an opening in the tie rod 34. Each wheel 32 is mounted using a triangular wheel support 38 fastened to the boxy structure. Preferably, each triangular wheel support 38 is fastened along the rear edge of base panel 14 and bottom rear edges of side panels 16, 18. Alternatively, the wheel supports may be fastened along the bottom edge of rear panel 20 and/or base panel 14. Tie rod 34 is inserted through openings in the wheel supports and supported therein so that the cart can pivot between a resting position and a transport position. At the resting position the cart pivots forward slightly so that the base panel rests on the ground causing the cart to stand upright alone. From the resting position, the cart is tilted backward to the transport position where the weight of the cart is carried by the wheels.

As is evident from the foregoing description, certain aspects of the invention are not limited to the particular details of the examples illustrated. For example, a two wheel cart has been described, but one or four wheels could be used. It is therefore contemplated that other modifications and applications will occur to those skilled the art. For example, while wood, paper and plastic have been described for constructing the panels, flexible composite or layered metal panels may be used. It is accordingly intended that the claims shall cover all such modifications and applications as do not depart from the true spirit and scope of the invention.

What is claimed is:

1. A cart for a refuse bag, comprising:

a base panel;

a left upright side panel having a bottom portion attached to said base panel and having a top portion with a left holding flap;

a right upright side panel having a bottom portion attached to said base panel and having a top portion with a right holding flap;

a rear upright panel having a bottom portion attached to said base panel and having a top portion with a top holding flap, said base panel, left and right upright side panels and rear upright panel forming a boxy structure, said rear upright panel defining an opening above said top holding flap with a portion of said rear upright panel above said top holding flap forming a handle for manipulating said cart; and a pair of wheels attached to said boxy structure.

2. A cart, as set forth in claim 1, wherein said wheels are adjacent said rear upright panel.

3. A cart, as set forth in claim 1, wherein said left holding flap folds into said boxy structure toward said left upright side panel.

4. A cart, as set forth in claim 3, wherein said right holding flap folds into said boxy structure toward said right upright side panel.

5. A cart, as set forth in claim 1, wherein said top holding flap folds into said boxy structure toward said rear upright side panel.

6. A cart for a refuse bag, comprising:

a base panel;

a left upright side panel having a bottom portion attached to said base panel and having a top portion with a left holding flap;

a right upright side panel having a bottom portion attached to said base panel and having a top portion with a right holding flap;

a rear upright panel having a bottom portion attached to said base panel and having a top portion with a top holding flap, said base panel, left and right upright side panels and rear upright panel forming a boxy structure, said rear upright panel defining an opening above said top holding flap with a portion of said rear upright panel above said top flap forming a handle for manipulating said cart; and a pair of wheels attached to said boxy structure adjacent said rear upright panel.

7. A cart, as set forth in claim 6, wherein said left holding flap folds into said boxy structure toward said left upright side panel to engage a left side panel of the refuse bag.

8. A cart, as set forth in claim 7, wherein said right holding flap folds into said boxy structure toward said right upright side panel to engage a right side panel of the refuse bag.

9. A cart, as set forth in claim 6, wherein said top holding flap folds into said boxy structure toward said rear upright panel to engage a rear panel of the refuse bag.

\* \* \* \* \*